United States Patent
Agha et al.

(10) Patent No.: US 10,216,599 B2
(45) Date of Patent: *Feb. 26, 2019

(54) COMPREHENSIVE TESTING OF COMPUTER HARDWARE CONFIGURATIONS

(71) Applicant: International Business Machines Corporation, Armonk, NY (US)

(72) Inventors: Salim A. Agha, Rochester, MN (US); Peter J. Heyrman, Rochester, MN (US); David A. Larson Stanton, Rochester, MN (US); Fraser A. Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,456

(22) Filed: May 26, 2016

(65) Prior Publication Data

US 2017/0344448 A1 Nov. 30, 2017

(51) Int. Cl.
*G06F 11/00* (2006.01)
*G06F 11/22* (2006.01)

(52) U.S. Cl.
CPC ............... *G06F 11/2242* (2013.01)

(58) Field of Classification Search
CPC ............... G06F 11/263; G06F 11/273
See application file for complete search history.

(56) References Cited

U.S. PATENT DOCUMENTS

| | | | |
|---|---|---|---|
| 6,883,116 B2 | 4/2005 | Lee et al. | |
| 6,975,954 B2 | 12/2005 | Mak et al. | |
| 7,836,343 B2 | 11/2010 | Feng et al. | |
| 7,979,759 B2 | 7/2011 | Carnevale et al. | |
| 8,271,990 B2 | 9/2012 | De et al. | |
| 8,413,146 B1 | 4/2013 | McCorkendale et al. | |
| 8,438,409 B2 | 5/2013 | King | |
| 8,695,007 B2 | 4/2014 | Wada et al. | |
| 8,977,918 B2 | 3/2015 | Haroun et al. | |
| 9,075,642 B1 | 7/2015 | Chalmer et al. | |
| 9,087,135 B2 | 7/2015 | Berry, Jr. et al. | |
| 9,128,740 B2 | 9/2015 | Stevens et al. | |

(Continued)

OTHER PUBLICATIONS

Anonymous, "Method to simplify testing of applications on multiple Operating System levels", an IP.com Prior Art Database Technical Disclosure, Oct. 14, 2011. IP.com No. IPCOM00021736D. 3 pages.

(Continued)

*Primary Examiner* — Bryce P Bonzo
*Assistant Examiner* — Katherine Lin
(74) *Attorney, Agent, or Firm* — Stosch Sabo

(57) ABSTRACT

A program operating to test a computer has a limit to the number of certain components that it can utilize, less than the number of those components included in the computer. A resource allocator program receives a signal to modify allocation of resources to the programs executing in the computer. The resource allocator detects that the computer is operating in a mode for testing and selects a subset of the components not allocated to the program to swap for those presently allocated. The resource allocator can receive the signal repeatedly to complete testing the computer.

20 Claims, 6 Drawing Sheets

(56) References Cited

U.S. PATENT DOCUMENTS

| | | | |
|---|---|---|---|
| 9,141,426 | B2 | 9/2015 | Bhandaru et al. |
| 9,459,995 | B2 | 10/2016 | Dolinsky et al. |
| 9,684,527 | B1 | 6/2017 | Hayward |
| 9,740,585 | B2 | 8/2017 | Lange et al. |
| 2003/0038842 | A1* | 2/2003 | Peck ................ G06F 11/263 715/763 |
| 2006/0221842 | A1 | 10/2006 | Terry |
| 2008/0215702 | A1 | 9/2008 | Zaharias |
| 2008/0235454 | A1 | 9/2008 | Duron et al. |
| 2009/0300605 | A1 | 12/2009 | Edwards et al. |
| 2011/0225457 | A1 | 9/2011 | De Poy Alonso |
| 2013/0238935 | A1 | 9/2013 | Radulescu |
| 2013/0290594 | A1 | 10/2013 | Callahan et al. |
| 2014/0019624 | A1 | 1/2014 | Kusuta et al. |
| 2014/0244983 | A1 | 8/2014 | McDonald et al. |
| 2015/0095608 | A1 | 4/2015 | Dusanapudi et al. |
| 2015/0113245 | A1 | 4/2015 | Lesartre et al. |
| 2015/0178129 | A1 | 6/2015 | Dube et al. |
| 2015/0269062 | A1 | 9/2015 | Sharda et al. |
| 2015/0293819 | A1 | 10/2015 | Havemose et al. |

OTHER PUBLICATIONS

IBM, "A method and apparatus for Linkage Based Software Development Lifecycle Management", an IP.com Prior Art Database Technical Disclosure. IP.com No. IPCOM000137130D. Original Publication Date: Jun. 9, 2006. Ip.com Electronic Publication Date: Jun. 9, 2006. 18 pages.

Laskowski, et al., "Assessment of Dynamic Look-Ahead Inter-Processor Connection Reconfiguration for Different Control Paradigms", IEEE, Proceedings of the Fifth International Symposium on Parallel and Distributed Computing (ISPDC'06). Jul. 6-9, 2006. 8 pages.

Agha, et al., "Comprehensive Testing of Computer Hardware Configurations", U.S. Appl. No. 15/165,381, filed May 26, 2016.

List of IBM Patents or Patent Applications Treated as Related, May 26, 2016, 2 pages.

Beckert, et al., "Designing Time Partitions for Real-Time Hypervisor with Sufficient Temporal Independence", DAC 15, Jun. 7-11, 2015, San Francisco, CA, USA. 6 pages.

Kim, et al., "Accelerating Full-System Simulation through Characterizing and Predicting Operating System Performance", 2007 IEEE International Symposium on Performance Analysis of Systems and Software. Apr. 25-27, 2007. San Jose, CA, USA. 11 pages.

* cited by examiner

COMPREHENSIVE TESTING OF COMPUTER HARDWARE CONFIGURATIONS

BACKGROUND

The present disclosure relates to testing a computer system, and more specifically, to testing hardware components of a computer system using a program that has limits to the configuration of hardware components included in the system.

SUMMARY

According to embodiments of the present disclosure, a method for testing a computer is directed to a computer having a plurality of hardware components, in which the hardware components include processors. The method includes receiving a signal to determine resources of the computer to allocate to a program executed by one or more of the processors included in the computer. The method further includes determining to allocate a hardware component to the program, in response to the signal. Also in response to the signal the method includes determining to allocate a hardware component to the program, and detecting that the computer is operating in a test mode.

Further in response to the signal, and based on the computer operating in the test mode, the method includes selecting a subset of hardware components of the computer. The hardware components selected to include in the subset are associated with the hardware component to allocate to the program, and includes hardware components not presently allocated to the program. The number of hardware components selected to include in the subset is no greater than a program limit. An embodiment performing the method swaps at least one hardware component from within the subset with at least one hardware component presently allocated to the program.

Swapping the hardware components comprises deallocating one or more of the hardware components presently allocated to the program and allocating one or more hardware component from the subset. In some embodiments, swapping the hardware components further comprises pausing execution of the program, performing the de-allocating and the allocating, and resuming execution of the program. Embodiments can perform the method to test one or both of processors and memory included in the computer. In some embodiments each of the hardware components to swap comprises a processor. Also in some embodiments a hypervisor performs the method. Further, in an embodiment, the program limit can be based on one or both of a maximum number of processors and a maximum amount of memory that the program can utilize.

The method is suitable to embody in a computer system and/or a computer program product having instructions executable by a processor.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
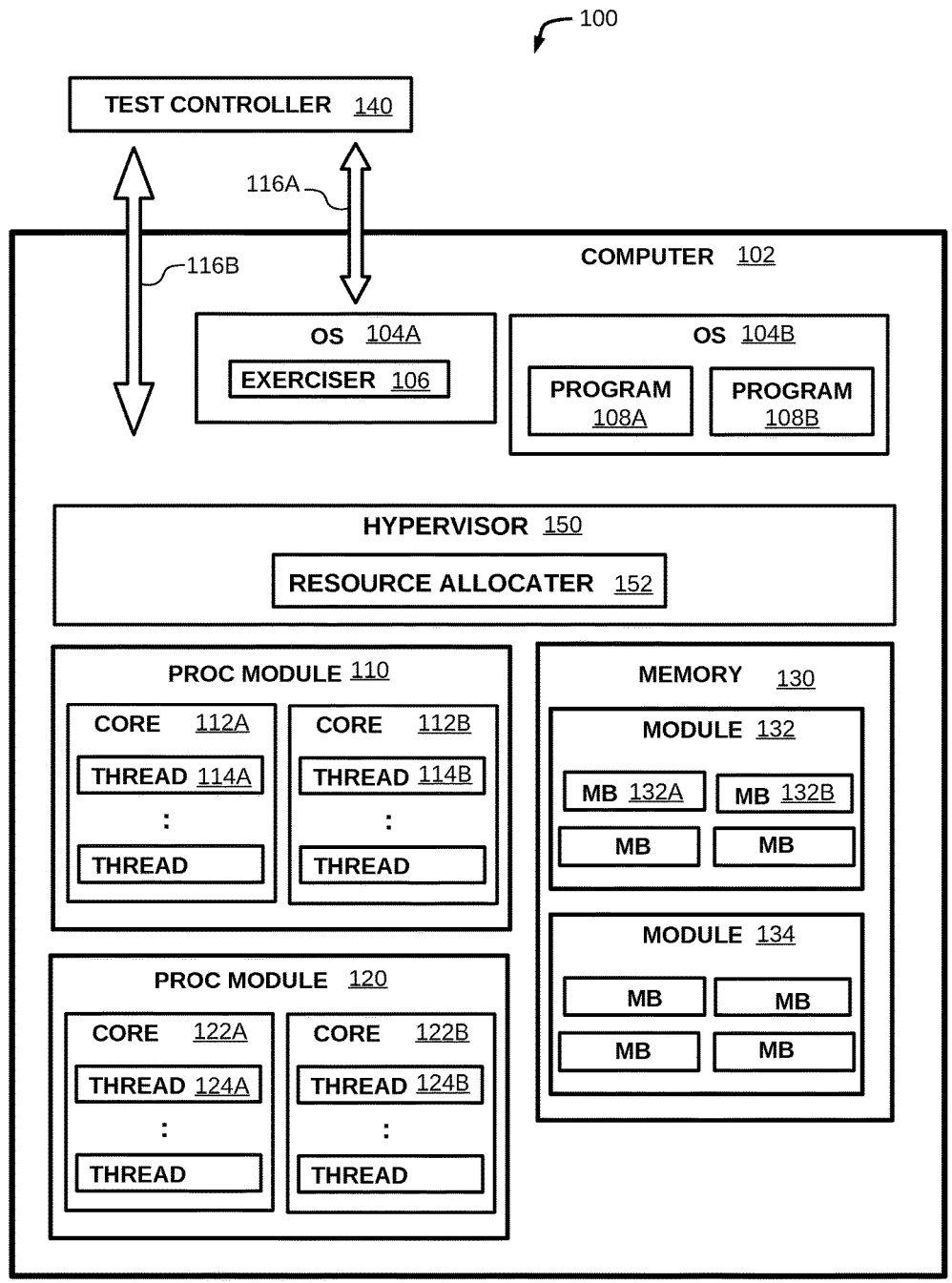
FIG. 1 is a block diagram illustrating an example computing system, according to embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure (hereinafter, "the disclosure") relates to testing a computer. More specifically, the disclosure relates to testing hardware components of a computer using a program—such as an operating system, or a program executing within an operating system—that has limits to the configuration of hardware components of the system it can configure.

Computers, and computing devices, often undergo testing of components in a final assembly configuration. As used herein, "computer" refers to any of a variety of systems or devices capable of performing general, or special purpose, computing operations, for example: desktop or laptop computers; mobile or cellular phones or devices; storage, compute, or network servers, or nodes thereof; and, network routers and gateways. A final assembly configuration of a computer can be a "customer configuration" of the computer, such as, for example, the type, number, and interconnection of components of the computer configured or assembled as a customer has ordered it, or as it will ship to a customer.

Testing of a computer in a final assembly configuration can have the benefit of verifying correct interconnections and inter-operations of components of the computer as the computer will be used in a customer or user installation. Testing a computer in a final assembly configuration can include testing both hardware and software, or "firmware", included in the computer system, and can include testing their interactions.

Computers can include a variety of hardware components to test, such as processors, memories, I/O interfaces and/or devices (including I/O "adapters"), and/or interconnections between hardware components (e.g., busses or other signal links). A test program can direct test operations to particular components, or particular elements, organizations, or interactions of components, of a computer. For example, a test program can test processors of a computer by directing operations to particular processor modules, particular cores of a processor module, or threads of a processor core. Directing operations to particular components (e.g., a processor) can induce interactions with other components (e.g., a different processor, or a memory or portion thereof).

Testing a computer can test interconnections between components, such as interconnections (e.g., data busses) between (for example) processor modules or cores, between electronic memory "modules" forming a memory in the computer, and/or between processor modules or cores and memory modules. A test program can direct test operations to physical, or virtualized instances of a hardware component, such as a virtual processor, a virtual memory, or a virtual I/O device. As used herein, except where specifically described otherwise, "test program" refers interchangeably to a program designed to test (or, by virtue of normal operations, effects testing) a hardware component, or to a program—such as an Operating System (OS)—in which the test program operates.

Preparing a computing system in a customer configuration, and for testing the system in that configuration, can include fully configuring and installing all hardware, firmware, and software components of the system. Programs that provide normal operating functions of a computer, and that utilize the components under test, can be limited in the number of components of a particular type that the programs can encompass. For example, an operating system can be limited to a particular number of processors (modules, cores, and/or total threads) that it can configure and utilize, or can be limited to a maximum amount of memory that it can configure and utilize.

A program can have limits to the number of components that it can utilize that derive from various design factors. For example, an operating system can have a configuration limit of a particular number of processor modules (or, "chips"), processor cores, processor threads, and/or an amount of memory. A program can have a configuration limit, such as the foregoing, and may have another limit to the number of such components that it can utilize at any given time, and a utilization limit can be less, for example, than a configuration limit. For example, an operating system can have a limit of, say, 128 processors (in particular combinations of modules, cores, and/or threads) but, for other reasons of the design of the operating system, or the computer on which the operating system is executed, can have a utilization limit of fewer processors. As used herein, the number, or amount, of a resource or hardware components that a program can "utilize" refers to any limit of the program that determines a maximum number or amount of the resources or components to allocate to the program in a computer testing environment.

Embodiments of the disclosure (hereinafter, "embodiments") can include computers that have a large number of particular types of components, such as a large number of processors, or a large memory, that can exceed the limits of programs used in a customer or final assembly configuration to test a computer. Embodiments can be comprised of "nodes", and individual nodes can have components, such as processors, memory, and I/O devices, and in aggregate the number of processors, amount of memory, or number of other components can exceed the limits of programs used in a customer or final assembly configuration to test a computer.

For example, testing a computer in a final assembly configuration having (for example) 64 cores that provide 8 threads each (a total of 512 threads) can include executing one or more programs under the control of an operating system, in which the operating system can be limited to (for example) 128 threads. A computer can have, for example 1 TB of memory and an OS used to test the computer may be limited to 256 GB of memory. In another example, a computer can be composed of perhaps four nodes, in which each node has (for example) 4 processors, each with 8 cores and 8 threads per core, totaling 128 cores and 1024 cores. The total of 1024 cores may exceed the number that an OS (for example), used to test the computer, can utilize.

Testing a computer, or components thereof, in which test programs are limited to fewer components than are configured in the computer overall, can require developing unique test programs, or modifying the programs (e.g., an OS) to remove component configuration limits. Unique test programs can be limited to use only for testing and may not be programs that otherwise ship with, or can be used in, the computer for normal (or, customer) operations. Modifying test programs, such as increasing the thread limit of an OS, can be complex, time-consuming, and/or expensive. In some embodiments, modifications may not be usable outside of a test environment; for example, an OS modification to increase a thread limit may not be supported for a customer installation. Accordingly, such modifications may not be feasible within the constraints of complexity, schedules, cost, or product support.

Alternatively, in some embodiments testing a computer using a test program that has component limits (e.g., an OS) can be accomplished by installing and managing multiple instances of the test program. For example, a logically or physically partitioned computer can possibly configure multiple instances of an OS, in which each OS instance can be allocated a subset of components, within the component limit of that OS. However, this can require configuring the computer in ways not normally configured in a customer installation, or that increase complexity and administration of the computer in a test mode.

Accordingly, embodiments can include features of a computer that are used in normal operations of the computer and can modify the configuration of components allocated to a test program during the test operations. It will be understood through various examples of the disclosure that, correspondingly, testing a computer in a final assembly configuration can be performed using a single instance of a test program, and without requiring modifications to the test program itself.

FIG. 1 illustrates an example computer system according to various embodiments of the disclosure. A computer system can include a computer, a source of inputs external to the computer, and one or more interfaces for the computer to receive the inputs and/or communicate results of operations to an input source, or an output consumer. For example, computer system 100 includes computer 102 in communication with test controller 140 by means of interfaces 116A and 116B. Test controller 140 can be a source of inputs to computer 102, and/or can be a consumer of outputs, or of results of operations (e.g., test operations or test status). Test controller 140 can manage, or control, testing of a computer, and/or components thereof.

In embodiments, test controller 140 can be, for example, a program executed by a processor. In alternative embodiments, a test controller can be a hardware component, or a combination of a hardware component and a program executed by a processor. In embodiments, a processor executing a test controller, and/or hardware comprising a test controller, can be a component of computer 102, or can be a component of another computer (not shown) in communication with computer 102.

A computer, according to example embodiments, can include one or more processors, and can include one or more memories. Processors can be implemented as physical processor modules, physical processor modules can contain one or more physical processor cores, and physical processor cores can include a plurality of physical processor threads. A physical processor thread can be an execution unit within a physical processor core and can be wholly, or partially, independent of other threads within that core (or, other cores). As used herein, "processor" refers generically to any form of hardware processing unit that can be configured or utilized as a "processor" unit within an operating system, or other program of a computer, including but not limited to a physical processor module, a physical processor core, a physical processor thread, or a virtual processor corresponding to a physical processing unit (including a virtualized fraction of a core or thread). To illustrate, computer 102 includes physical processor modules 110 and 120, each of which contains a plurality of processor cores, such as 112A, and 112B, and 122A and 122B, respectively. Each of the processor cores in turn has processor threads, such as thread 114A in Core 112A, and 114B in core 112B.

Memories in a computer can be implemented as electronic memory modules, which can be physical packaging structures for the memory. Memory within a memory module, or the memory as a whole (e.g., comprising the memory included in all the memory modules) can be organized as memory blocks. For example, computer 102 includes memory 130, which is comprised of memory modules 132 and 134, which in turn are organized as memory blocks, such as 132A and 132B.

A computer can include a single memory comprised of memory modules and/or memory blocks, or can include a plurality of memories, each memory in the plurality of memories can be comprised of memory modules and/or memory blocks, and each memory can have a different function, or role, within the computer. For example, one memory can be a main memory, and other memories can be cache memories, such as L1, L2, or L3 caches. Memories can be implemented using various electronic technologies, including flash memories.

A computer can include a plurality of OSes, and can logically, or physically, partition resources within it for allocation to the OSes. A computer can include a hypervisor that can manage partitioning the resources of the computer, and can manage operation of the OSes. A hypervisor can, for example, allocate particular physical resources (e.g., processors and/or memory blocks) to particular OSes, and can virtualize the physical resources. For example, a hypervisor can create a virtual processor as a physical processor core or thread, or a fractional portion of one and/or the other. A hypervisor can be a program (or, programs) operating in the computer (e.g., a "built-in" component of the computer), and can be embodied, for example, as firmware. In other embodiments, an OS can include the functions of a hypervisor and can "host" other OSes as "guest" OSes.

To illustrate, computer 102 includes example OSes 104A and 104B, and hypervisor 150. An OS can host (e.g., provide resources to, and/or manage execution of) programs. For example, in computer 102 OS 104B hosts programs 108A and 108B, and OS 104A hosts exerciser program 106. Hypervisor 150 can manage partitioning the processor and memory resources (e.g., cores 112A and 112B, threads 114A and 114B, and/or memory blocks MB 132A and 132B) of computer 102. Managing partitioning of resources of the computer can include configuring the resources, and can include allocating, or de-allocating (e.g., removing) resources to/from one or more OSes. Embodiments can allocate processing resources to programs (or, to OSes) in units of, for example, cores and/or threads and can allocate memory resources in units of, for example, memory blocks, for example.

Embodiments can allocate processor and/or memory resources to programs so as to improve performance or efficiency of the programs with respect to the processors and/or memory. For example, allocating processors and/or memory that have higher performance (e.g., access latency by a processor to the memory) compared to other processor and/or memory resources can improve performance of a program. In embodiments a hypervisor can include a resource allocation function (or, program) that can determine particular processor and/or memory resources to allocate to programs (e.g., OSes) for improved program and/or computer (overall) performance. For example, hypervisor 150 includes resource allocator 152 (e.g., a program or function associated with the hypervisor). Resource allocator 152 can determine an allocation of particular processors and memory to an OS to improve the performance of OSes, programs, or computer 102 overall.

To illustrate, cores within processor module 110 may have lower access latency to memory module 132 than, for example, cores of processor module 120. In contrasts cores within processor module 120 may have lower access latency to memory module 134 than, for example, cores of processor module 110. Accordingly, resource allocator 152 (or, hypervisor 150) may allocate cores and/or threads of processor module 110 (e.g., core 112A or 112B, or threads 114A or 114B) along with memory blocks in module 132 to, for example, OS 104A, and may allocate cores and/or threads of processor module 120 (e.g., core 122A or 122B, or threads 124A or 124B) along with memory blocks in module 134 to, for example, OS 104B.

To test a computer, such as computer 102, or components thereof, a computer system can include a test controller, which can manage or direct testing of components of the computer. A test controller can be a component of a computer, or can be embodied in a device (e.g., another computer) in communication with the computer under test, or can be a combination of these. For example, in FIG. 1, test controller 140 can be embodied in another computer (not shown) in communication with computer 102 by means of interfaces 116A and/or 116B.

A test program can be a program that utilizes components under test in a computer. A test program can be a program designed specifically to test a particular component (or, component type), or can be a program that, by virtue of its normal operations, utilizes a component in such a way as to also effect testing operations of the component. A test program can be embodied as a program executing within a computer and the program can be a program executing under the control of ("within") an OS. For example, a test program can be embodied as exerciser program 106 operating within OS 104A, and utilizing computer 102 resources (e.g., processor and/or memory) allocated to OS 104A.

A test controller can interact with a test program to control or manage certain operations of a test program. For example, test controller 140 can, for example, establish operating parameters that determine what components (e.g., processors or memory) exerciser 106 tests, or in what manner (e.g., what specific functions) exerciser 106 tests a component (e.g., a processor). Test controller 140 can manage installing OS 104A and/or exerciser 106 on computer 102, for example. To illustrate the disclosure, but not intended to limit embodiments, interface 116A can be an interface for test controller 140 to communicate with OS 104A and/or exerciser program 106. Interface 116B can be an interface for test controller 140 to communicate with hypervisor 150, or resource allocator 152.

For example, computer 102 (or, hypervisor 150) can allocate particular processor and/or memory resources (cores/threads, and/or memory modules or blocks) to OS 104A. Test controller 140 can, for example, communicate with hypervisor 150 to initiate, and/or terminate execution of a OS 104A or exerciser 106 (e.g., to boot or terminate OS 104A). Test controller 140 can provide test parameters to hypervisor 150. Test controller 140 can use interface 116B to communicate with hypervisor 150 to perform these operations.

Exerciser 106 can perform various instructions that utilize features or functions of an allocated processor, or that cause an allocated processor to access memories or pass data between combinations of processors, such that operations of the exerciser test the allocated processor and memory resources, and/or interconnections of processors to each other and/or to the memories of computer 102. Test controller 140 can, for example, communicate with OS 104A, or exerciser 106, for example, to provide test parameters to OS 104A, and/or exerciser 106, or to monitor execution or results of test operations. Test controller 140 can use interface 116A to communicate with OS 104A, and/or exerciser 106, to perform these operations.

Interfaces in a computer system can be any of a variety of interfaces suitable for a program (e.g., a test controller, such as 140) to communicate with a computer or a component thereof. For example, interfaces 116A and/or 116B can be network interfaces, or I/O device interfaces. A test controller, such as 140, can communicate, for example, using an Ethernet connection as interface 116A or 116B. Embodiments can implement interfaces 116A and 116B as different types of interfaces. For example, interface 116A can be an Ethernet interface between test controller 140 and OS 104A and/or exerciser 106, and interface 116B can be a different type of interface. Interfaces 116A and/or 116B can be, or include, one or more data structures read and/or written by a test controller, a test program, a hypervisor, and/or a resource allocator, and the data structure(s) can be stored in a memory of the computer.

Figure 2:
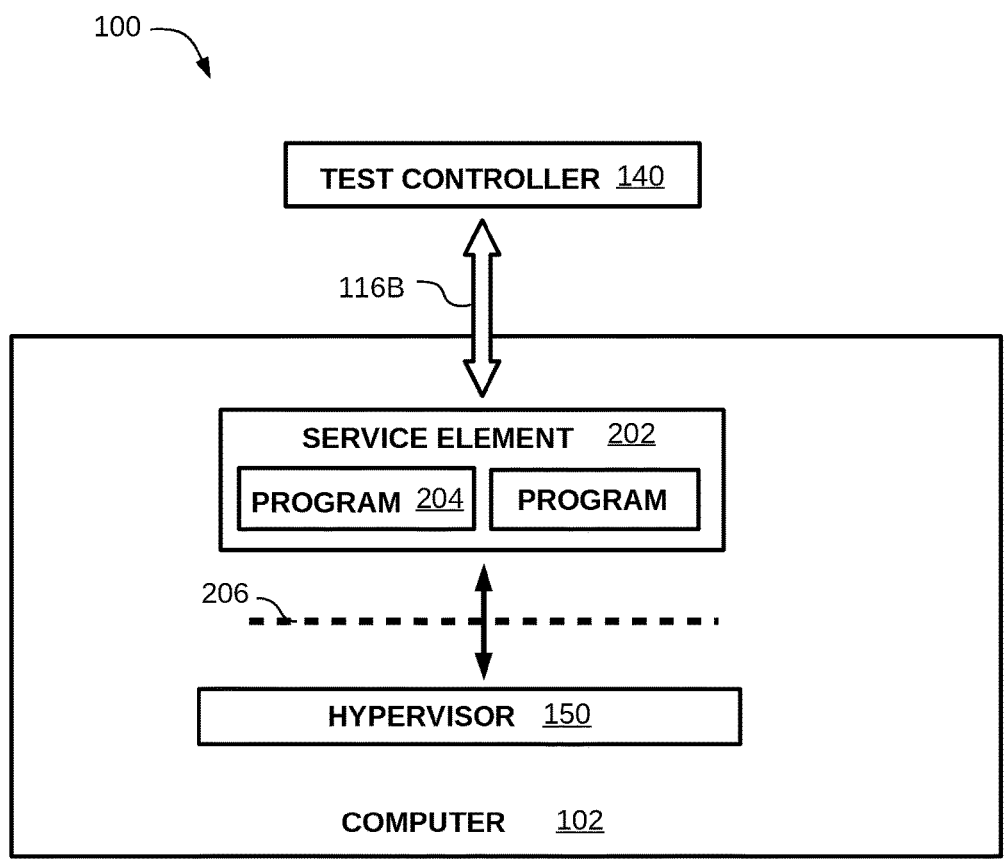
FIG. 2 is a block diagram illustrating an example input interface in a computing system, according to embodiments of the disclosure.

FIG. 2 illustrates an example embodiment of a computing system that includes a service element. A service element can perform particular operations not included in ordinary operations of executing programs within the computer, such as service operations. For example, a service element can boot the computer, terminate the computer, test circuits of a computer (e.g., as part of booting the computer), log particular events (e.g., error events of operating conditions) during operation of the computer, load software or firmware onto the computer, and so forth. By way of example, computer 102 of FIG. 1, as illustrated in FIG. 2, further includes service element 202.

A service element can be a computing device, an electronic device, a program, a hardware component or a combination of any of these. For example, a service element can include a processor and/or memory (both not shown) and can include programs, such as program 204, that can execute on the processor. In other embodiments, a service element can be a program, or a collection of programs that operate together to perform functions within, or to administer, a computer. A service element can be a function, or a program, of a hypervisor. A service element can be included in a computer, such as service element 202 included in computer 102. In other embodiments (not shown), a service element can be included in another computer, for example, in communication with a computer, such as computer 102.

In embodiments, a service element can receive commands and/or parameters from a test controller, can communicate status or results of a test program to a test controller, and can use an interface to perform the communications. For example, in FIG. 2 service element 202 can receive test commands and/or parameters from test controller 140, or can communicate test program status or results to test controller 140, by means of interface 116B. Interface 116B can be a program function or call interface, a memory data structure, a message interface, a network interface, or any of a variety of interfaces suitable for elements of a computing system to communicate.

In embodiments, a service element, or programs executing within a service element, can operate as an intermediary between a hypervisor (or, another function of a computer) and a test controller. For example, a test controller can have a user (or, command) interface by which a user (e.g., a test operator) can input commands and/or parameters or receive test status and/or results, and a service element can operate to mediate the exchange of information between a hypervisor and test controller. Using the example of FIG. 2, test controller 140 can communicate commands and/or parameters to service element 202 (or, programs thereof, such as 204) and service element 202 (or, program 204) can in turn communicate these to hypervisor 150 using, for example, interface 206. Interface 206 can be a programming function interface, a data structure, a messaging interface, a network interface, or any of a variety of interfaces suitable for elements of a computing system to communicate.

FIG. 1. and FIG. 2 illustrate an example embodiment of a computer system according to the present disclosure. However, these are not intended to limit embodiments. Rather, it would be evident to one of ordinary skill in the art, and within the scope of the disclosure, that a test controller and/or a test program can be embodied in a variety of ways within and/or in communication with a computer. It would be further apparent to one of ordinary skill in the art that a computer can embody and/or test components other than processors and memories, that processors and/or memories can be configured and/or include components different from those illustrated, and that, for example, allocation of resources of the computer to programs within the computer can be performed by elements other than a hypervisor and/or resource allocator. It would be still further evident to one of ordinary skill in the art, and within the scope of the disclosure, to utilize interfaces between a test controller and computer, or within a computer between a service element and a test controller or hypervisor, other than as illustrated or described in the examples of FIG. 1 and FIG. 2.

In embodiments, a test program can have a limit to the number of components of a particular type that it can configure. For example, with reference again to FIG. 1, exerciser 106 can utilize processors allocated to OS 104A. However, OS 104A, or test program 106, can have a limit to the number of processors that it can configure and/or utilize. If computer 102 includes more processors than the limit, OS 104A or exerciser 106 can be allocated only that limit number and cannot test those processors not allocated. For example, computer 102 may include a total of 64 processor cores, each having 8 threads, for a total of 512 threads that can be allocated to an OS as processors. OS 104A may have a limit of 128 processors, such that computer 102 (e.g., hypervisor 150 operating in computer 102) can allocate to OS 104A at most 128 of the 512 total processor threads. Consequently, in conventional systems, exerciser 106 can test only those allocated 128 processors in various combinations, such as 16 processor cores utilizing all 8 threads or 64 cores utilizing only 2 threads each.

Testing all 512 processors may be accomplished, in conventional systems, by adding additional instances (e.g., three more) of OSes, like OS 104A, and/or exerciser programs, like exerciser 106, and allocating different sets of processors to each instance. However, configuring and operating multiple instances of test programs (e.g., OSes and/or exercisers) can make the test environment complex to administer or operate.

Embodiments described herein can dynamically manage allocation of computer resources to programs, and can improve over the limitations of the conventional system described above. For example, in the embodiments described herein a computer can include a resource allocator function and the resource allocator can dynamically allocate and/or de-allocate resources to an OS or other program. A resource allocator can be capable of adjusting allocation of resources to programs (e.g., OSes) while the computer is operating. A resource allocator can be capable of adjusting resource allocations to programs to use particular resources (e.g., particular processors and/or memory modules or blocks) that can improve performance of the program or the computer overall. In some embodiments, a resource allocator can be a component or function of, for example, hypervisor and can manage allocation of resources, such as processors and/or memory, to OSes. In other embodiments a resource allocator can be a component or function of a computer to test, or another computer in communication with a computer to test.

In embodiments of the disclosure, a resource allocator that dynamically manages resource allocation to programs (e.g., a hypervisor, or a resource allocator component or function of a computer) can operate to "swap" resources allocated to a test program (e.g., processors allocated to an OS) while the test program is operating. By swapping resources while a test program is operating, a single instance of a test program can test all instances of a particular resource of the computer, despite the test program itself having a limit to the number of resources of that particular type that it can utilize.

"Swapping" resources, as used herein, refers to selecting a next set of resources of a particular type. For example, swapping processors can result in selecting a next set of processor resources, such as a next consecutive set of processor threads or cores. In another example, swapping processors can result in selecting a next set of processor threads or cores according to a particular organization of the processors, such as particular processor modules or cores connected to particular memory blocks, as opposed to processor modules or cores connected to other memory blocks. Selecting a next set of resources can be based on, for example, formulas (e.g., "next consecutive" set of a particular number of resources) or configuration parameters or rules.

Figure 3:
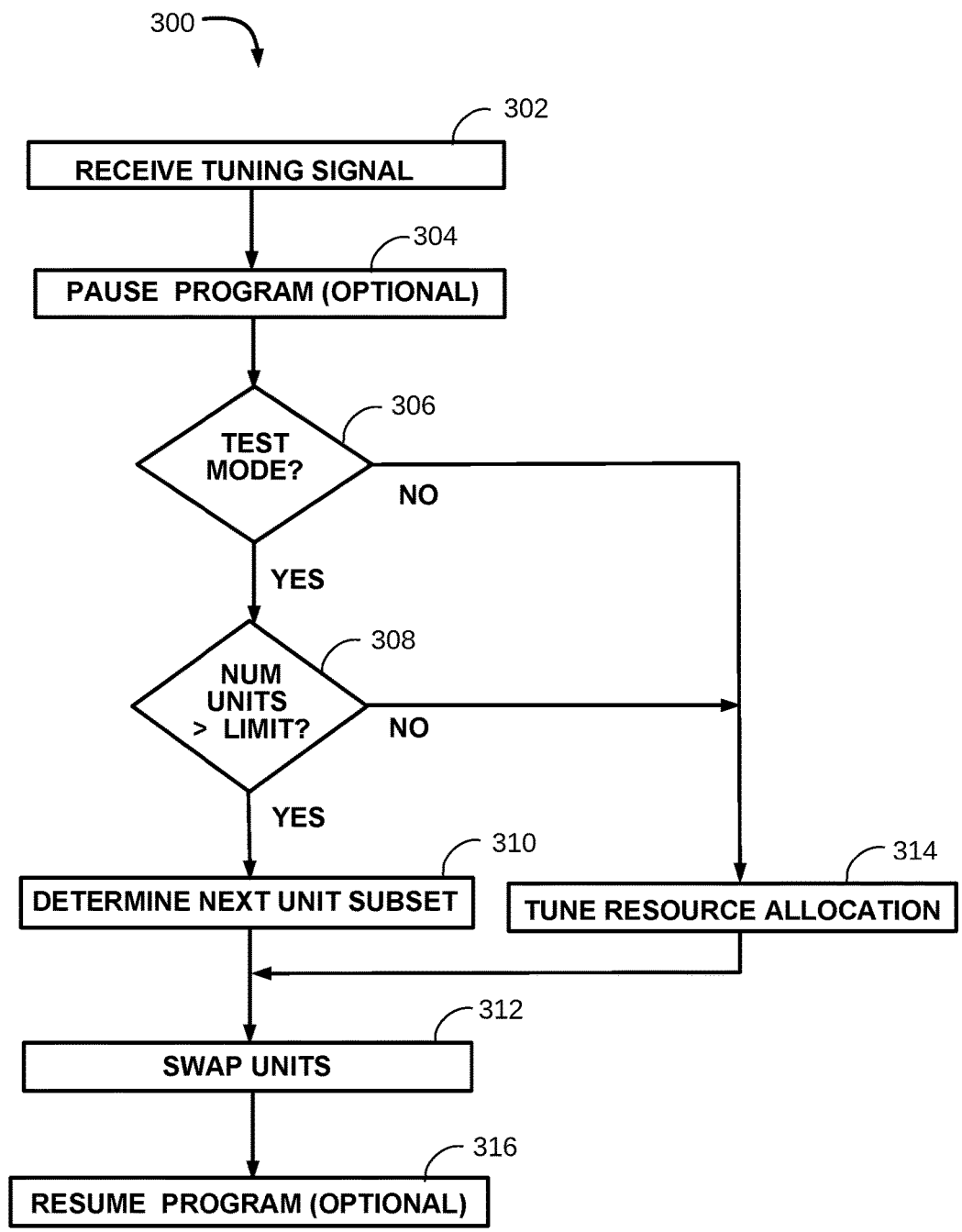
FIG. 3 is a flow chart illustrating an example method for testing components of a computing system, according to aspects of the disclosure.

FIG. 3 illustrates an example method, 300, to swap (e.g., de-allocate and allocate) resources allocated to a single instance of a test program while the test program is operating (i.e., dynamically). For purposes of illustrating the method, but not limiting to embodiments, the method is described as performed by a resource allocator function or component of a computer (e.g., a hypervisor, or a function thereof, such as resource allocator 152 of FIG. 1). Additionally, for purposes of illustrating the example of FIG. 3, but not limiting to embodiments, the method is described in the context of testing a computer, and "test program" is understood to encompass either or both of an OS, or a program operating within the OS, such as OS 104A and/or exerciser 106 of FIG. 1. However, it would be apparent to one of ordinary skill in the art that method 300, or elements thereof, can be performed to select components to swap, within particular program limits, in contexts other than testing a computer.

At 302 the resource allocator receives a signal to determine resource allocation to programs configured to execute on the computer. The programs may be operating, or may be configured to operate but in an inactive or suspended state, at the time of the signal. The signal can be any of a variety of computing mechanisms to signal a function to operate, such as a programming function call, a message, expiration of a timer, or, for example, an interrupt signal. The signal can be associated with an input to the computer; for example, the signal can be associated with a message or other form of signal from a test controller (e.g., test controller 140 of FIG. 1). The signal can be associated with a particular program (e.g., an OS) to determine resource allocation. Alternatively, the signal can be a signal to determine resource allocation for a plurality, or all, of a set of programs (e.g., all or a particular set of OSes).

At 304 the resource allocator, optionally, pauses execution of the program(s) associated with the signal. The signal can be directed at a particular test program (e.g., an OS) executing on the computer or, alternatively, can be directed at improving particular resource utilization or other operating states of the computer. In some embodiments, at 304 the resource allocator pauses execution of programs associated with the signal. For example, the signal can be associated with improving a particular OS executing on the computer, or the computer can be executing a single OS, and the resource allocator can pause execution of that OS in response to the signal. In other embodiments, the resource allocator can omit pausing the program and perform other elements of the method while the program continues to execute.

At 306 the resource allocator determines if the computer is operating in a test mode or, alternatively, some other mode in which the resource allocator should swap resources allocated to the program(s). The resource allocator can determine that the computer is in a test mode based on, for example, a configuration parameter stored in a memory of the computer, or based on an input received (e.g., in combination with the signal) from a test controller or a test program.

If, at 306, the resource allocator determines that the computer is not operating in a test (or, other swapping) mode, at 314 the resource allocator performs determines allocation of resources (or, components) to the program (e.g., an OS). For example, the resource allocator can determine particular processor cores and/or memory blocks or modules to allocate to a program to improve performance of the program or the computer overall. Under some conditions, a resource allocator can determine, at 314, to not modify resources allocated to the program(s).

Under other conditions, a resource allocator can determine, at 314, to de-allocate particular resources, or resource types, allocated to the program(s) and to optionally replace those with other resources, which can be of the same type or can be of a different type. At 312, the resource allocator swaps the resources (e.g., processor cores and/or memory). The resource allocator can de-allocate the currently allocated set of resources and allocate the next set of resource, determined at 314, to perform the swapping.

In embodiments of the disclosure, a computer can perform the swapping of resources, such as at 312, transparently to the test program. For example, a hypervisor, or a resource allocator, can exchange processors and/or an amount of memory presently allocated to a test program with an equivalent number of different processors, and/or an equivalent amount of different memory such that, subsequent to swapping resources at 312, the test program is not, or need not necessarily be, aware that the particular processors and/or memory are different physical units than previously allocated. A processor can be a virtual processor, and/or memory can be virtual memory, and the different physical processors and/or memory swapped at 312 can be transparent to the test program.

If, at 306 the resource allocator determines that the computer is operating in a test or other swapping mode, at 308 the resource allocator determines if the program has a limit to the number of resources units of a particular resource type. For example, at 308 the resource allocator can determine if the OS, or a program operating in the OS, has a limit to the number of processors, or an amount of memory or number of memory blocks, that the OS or program can utilize. The resource allocator can determine if the OS (or, program) has a limit by utilizing configuration parameters, for example, or based on a particular known type of OS (e.g., a particular variant or version of a Unix operating system) or program.

If, at 308, the resource allocator determines that the program does not have a limit, or that the computer has no more resource units of that type than a program limit, at 314 the resource allocator performs normal allocation functions. Alternatively, at 308, if the resource allocator determines that the program (e.g., an OS) has a limit and that the number of resource units of that type is greater than the program limit, at 310 the resource allocator determines a next set of resource units (e.g., processors) to swap for the units presently allocated to the program. For example, if the resource allocator determines to change allocation of processors to an OS, the resource allocator can select a next consecutive set of processors (e.g., a next set of cores and threads within those cores).

In embodiments, selecting units (e.g., processors or memory blocks) at 310 in a next subset can be associated with resources of the computer to allocate in response to the signal. For example, in response to the signal, the resource allocator may modify allocations of processors, and/or memory. Accordingly, at 310, the resource allocator may select a subset of processors to swap. In an embodiment, a subset including processors may be determined based on, for example, particular memory block, or memory modules, presently allocated to, or to de-allocate from, a program. A subset including processors may be determined based on particular processor, presently allocated to, or to de-allocate from, a program. In some embodiments, a subset including processors may be determined based on a relationship between the processors and another component of the computer to allocate (or, de-allocate) in response to the signal. It would be apparent to one of ordinary skill in the art that various relationships between particular components to allocate to, or de-allocate from, a program, and other components allocated to a program (e.g., processors and/or memory) can be a factor in selecting such other components (e.g., processors and/or memory) to swap with those of that type presently allocated to the program.

At 312 the resource allocator swaps the resources (e.g., processor cores and/or memory). The resource allocator can de-allocate the currently allocated set of resources and allocate the next set of resource, determined at 310, to perform the swapping. At 316, if the resource allocator had, at 304, paused execution of the program, the resource allocator can, optionally, resume execution of the program with the program now utilizing the resources determined at 314. In other embodiments, the resource allocator can determine, at 316, to not resume execution of the program. For example, if execution of the program had not been paused (at 304, for example) or resuming execution of the program is deferred to a subsequent time, event, or other component of the computer, the resource allocator can determine, at 316, to not resume execution of the program.

In embodiments, at 316 a resource allocator can, optionally, signal another program that the swapping is complete. For example, a resource allocator such as resource allocator 152 of FIG. 1 can, optionally, signal test controller 140 that swapping processors (for example) allocated to OS 104A is complete. Test controller 140 may, in response, communicate with exerciser 106 to, for example, restart a particular set of test operations using the swapped processors.

An embodiment can repeat method 300 to effect testing of all resources of a particular type. For example, with reference again to FIG. 1, computer 102 can boot OS 104A with a particular starting allocation of processors and/or memory blocks less than the total number of processors or memory blocks in the computer. Hypervisor 150 may manage allocation of the processors and/or memory to OS 104A and may initiate execution of (e.g., booting) OS 104A.

Test controller 140 can signal OS 104A to execute exerciser 106 and exerciser 106 can perform particular test operations directed at the processors and/or memory presently allocated to OS 104A. Upon completing the test operations, test controller 140 can signal, for example, resource allocator 152 to modify the resources and the resource allocator can perform method 300 of FIG. 3 to swap processor and/or memory resources allocated to OS 104A. The resource allocator can signal test controller 140 that the swapping is complete and test controller 140 can signal OS 104A, or exerciser 106, to restart the test operations utilizing the processors and/or memory now allocated to OS 104A (i.e., swapped). Test controller 140 and resource allocator 152 can repeat the swapping process (utilizing, for example, method 300) until test controller 140 determines that all processors and/or memory (or, for example, the interconnections between the processors and/or memory) have been utilized by exerciser 106.

The foregoing description of the example method 300 of FIG. 3 is to illustrate features and aspects of the disclosure. However, it would be apparent to one of ordinary skill in the art, and within the scope of the disclosure, that means other than those of the examples can initiate swapping of components, and functions of a computer other than those of the examples can perform the swapping. For example, an embodiment can optionally not include a test controller, an exerciser program can initiate swapping resources, and a function of a computer other than a hypervisor or resource allocator can perform the swapping. It would be further apparent to one of ordinary skill in the art, and within the scope of the disclosure, to apply various criteria to determining a next set of resources (e.g., components under test) to swap.

Figure 4:
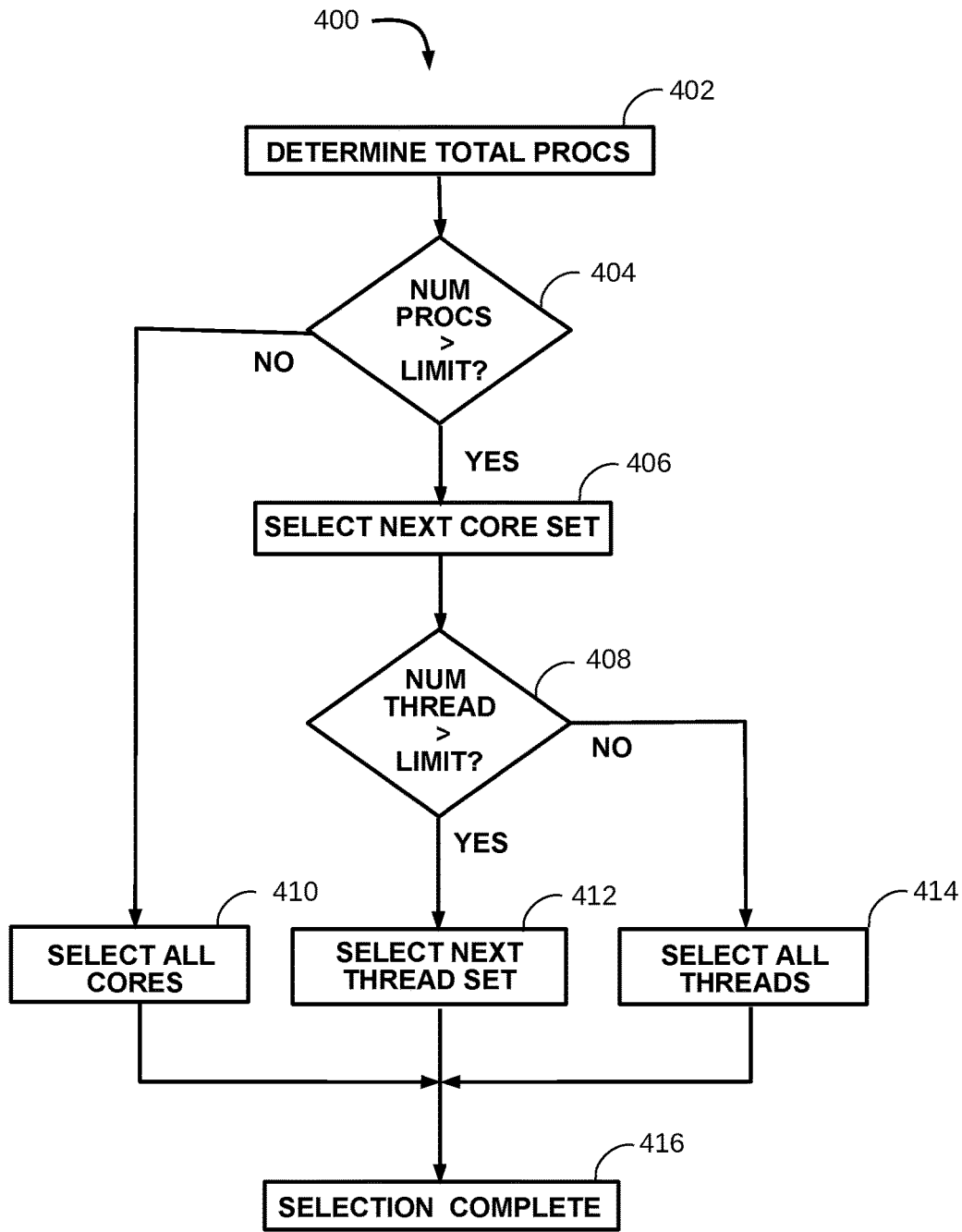
FIG. 4 is a flow chart illustrating an example method for selecting components to swap, according to aspects of the disclosure

FIG. 4 illustrates an example method, 400, to determine a next subset of resources, or components, to allocate to a program. For purposes of illustrating method 400, but not limiting to embodiments, method 400 is described as performed by a resource allocator function of a computer (e.g., a hypervisor, or a function thereof, such as resource allocator 152 of FIG. 1). Method 400 can be performed in response to the resource allocator determining that the computer is operating in a mode (e.g., a test mode, or a resource adjustment mode) in which the resource allocator should swap resources, such as when performing 310 of FIG. 3 method 300.

Further, for only purposes of illustrating the method but not limiting embodiments, method 400 is described with respect to swapping processors in a computer, such as 102 of FIG. 1, in which an OS, such as 104A of FIG. 1, has a limit to the number of processors it can utilize. Using the example computer 102 of FIG. 1, processors in the computer comprise processor modules in which each module comprises a set of physical processor cores, each having a plurality of physical processor threads.

At 402, the resource allocator determines a total number of processors included in the computer. In embodiments, a total number of processors can be, for example, a number of processor modules, a number of processor cores, a number of processor threads, or a number of modules, multiplied by a number of cores per module, and further multiplied by a number of threads per core.

At 404 the resource allocator determines if the total number of processors included in the computer (using computer 102 of FIG. 1 as an example) is greater than a program limit, such as a limit to the number of processors that OS 104A of FIG. 1 can utilize. If the total number of processors (e.g., the total number of threads in the combination of all cores of all processor modules in computer 102) is not greater than the OS 104A limit, at 410 the resource allocator can select all cores, and all threads within those cores, included in computer 102 (i.e., the cores included in the totality of processor modules included in the computer) and, at 416 the selecting the processors is complete. Alternatively, at 410, the resource allocator can determine that no replacement processors should be selected. For example, if all processors in computer 102 are presently allocated to OS 104A, the resource allocator can determine that there are no other processors to swap for those presently allocated. In another example, a resource allocator may modify memory allocated to a program and, correspondingly, may determine to not swap processors allocated to the program.

If, at 404, the resource allocator determines that total number of processors included in computer 102 (for example) is greater than the limit to the number of processors of OS 104A (for example), at 406 the resource allocator selects a next set of cores from which to select the processors to swap for those presently allocated to OS 104A. The resource allocator can select, for example, the next consecutive ordinal core in the system (e.g., core 2, in a case in which processors in core 1 are presently allocated). In another example, the resource allocator can select a core, or set of cores, according to a configuration parameter, such as a parameter associated with testing particular configurations of processors or cores, interconnections between processors, or interconnections between particular processors and particular memory modules. In some embodiments, a next set of processors can include some processors allocated to a program and other processors not allocated to the program.

At 408, the resource allocator determines if the total number of threads in the combined set of cores selected at 406 exceeds the processor limit of OS 104A. If not, at 414 the resource allocator can select all threads of the next core set selected at 406 to swap for the processors presently allocated to OS 104A and, at 416 the selecting the next set of processors is complete.

Alternatively, if the total number of threads in the combined set of cores selected at 406 exceeds the processor limit of OS 104A, at 412 the resource allocator can select a subset of threads from among the cores selected at 406. The resource allocator can select, for example the lowest ordinal number of threads, in the lowest ordinal number of cores in the selected next core set, that total less than the processor limit of OS 104A. In another example, the resource allocator can select a core, or set of cores, and threads within the cores, according to a configuration parameter, such as a parameter associated with testing particular configurations of processors or cores, interconnections between processors, or interconnections between particular processors and particular memory modules. At 416 the selecting the next set of processors is complete.

In completing the selection of the next set of processors, at 416, the resource allocator can initiate swapping the selected set for the processors (or, in general, resources or components under test) presently allocated to the OS 104A (or, in general, to a program). For example, completing selecting the processors to swap for the presently allocated processors, at 416 the resource allocator can initiate performing 312 of FIG. 3 method 300. An embodiment can repeat method 400 to select a subset of resources or components (e.g., processor modules, cores, threads, and/or memory) to swap, below a program limit, so as to accomplish testing all resources or components utilizing a single instance of a test program.

While example method 400 is described with respect to swapping processors to allocate to a program, the example is not intended to limit embodiments. It would be apparent to one of ordinary skill in the art to apply the example method 400 to swapping memory modules, or memory blocks, for example. It would be further apparent to one of ordinary skill in the art that a method within the scope of the disclosure can be used to select components, to swap with other components presently allocated to a program, other than processors and/or memory resources. Additionally, it would be apparent to one of ordinary skill in the art to apply criteria other than consecutive ordinal component numbers (or, identifiers) or configuration parameters to select a next set of components (or, resources) to swap for those presently allocated.

In embodiments, testing a computer can include testing interconnections, or interfaces, between components of a computer. A "bus" is one form of interconnection between components of a computer and, for purposes of illustrating the disclosure, unless otherwise characterized or specified, as used herein "bus" refers generically to an interconnection between components of a computer. In embodiments, a bus can be, for example, an interconnection between processors, between modules or blocks of a memory, or between processors and modules or blocks of a memory. Within a processor module, for example, a particular bus (or, type of bus) can interconnect cores within the module. In another example, a bus can interconnect cores in one processor module with cores in another processor module. A bus can interconnect cores in a processor module with particular memory modules, or memory blocks.

Embodiments of a computer, within the scope of the disclosure, can include "nodes", and each of the nodes can comprise a set of processors and/or memory. Processors in a node can be processor modules that include cores and threads, and memory within a node can include memory modules and/or memory blocks. Processors in one node can be connected to processors, and/or memory, in another node. A bus, or particular type of bus, can interconnect the processors within a node to each other, or to memory also within that node, as well as to processors and/or memory in other nodes.

Figure 5:
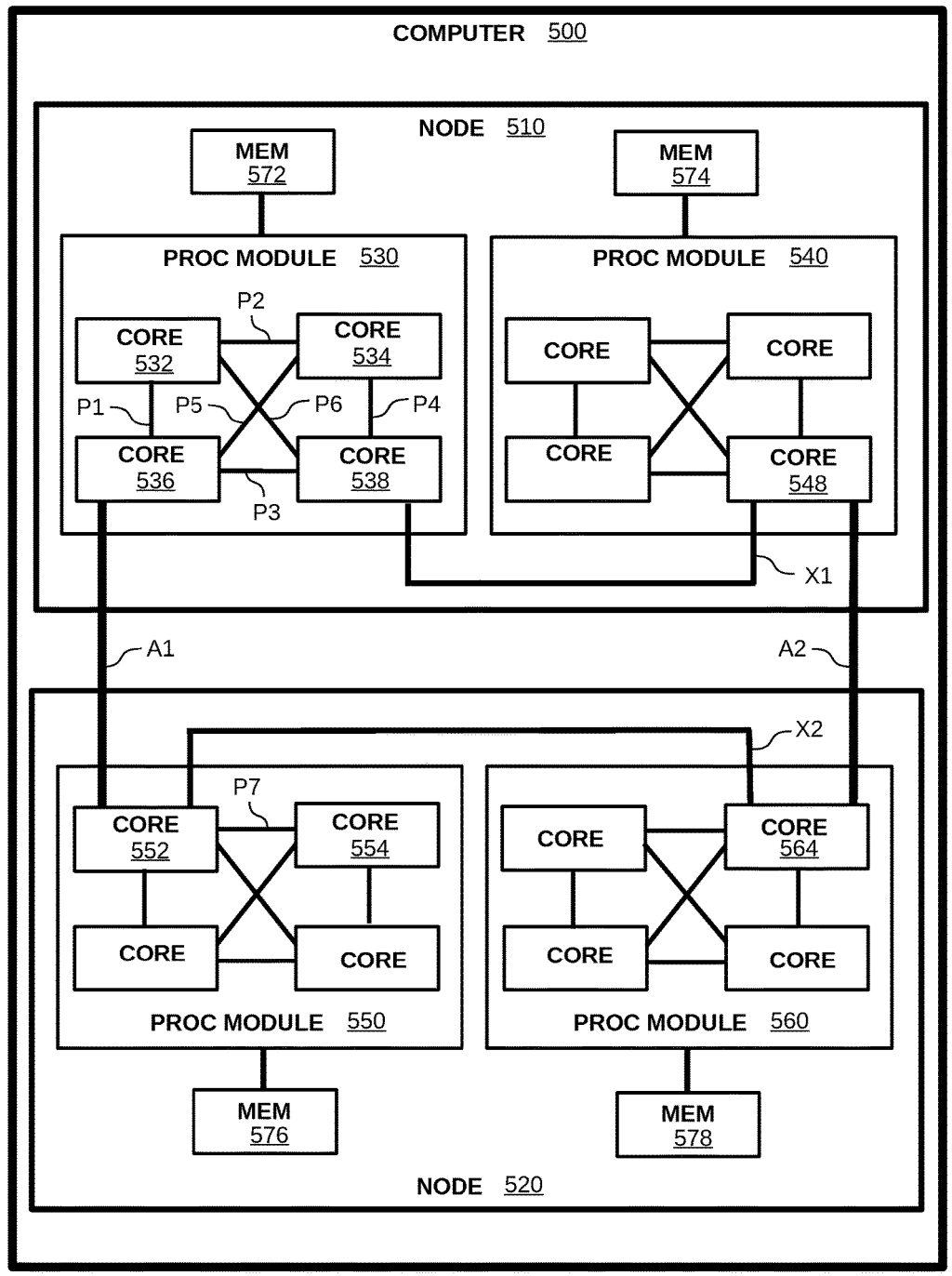
FIG. 5 is a block diagram illustrating example processor interconnections within a computer, according to aspects of the disclosure.

FIG. 5 illustrates an example computer, 500, comprised of nodes and buses interconnecting processors within modules, between modules within a node, and between processors in modules in different nodes. Computer 500 includes nodes 510 and 520. Each of nodes 510 and 520 include processor modules; node 510 includes modules 530 and 540, and node 520 includes modules 550 and 560. Each of the processor modules include processor cores such as cores 532, 534, 536, and 538 included in processor module 530. The processor cores can further include processor threads (not shown), such as illustrated in computer 102 of FIG. 1.

In embodiments, the number of processor modules in one node can be the same as that of other nodes, or different nodes can have a different number of processor modules. Processor modules included in a node can be all of the same type (e.g., implement the same instruction set architecture) and/or configuration (e.g., have the same number and/or types of cores), or can be of different types and/or configurations.

Cores within a computer can be interconnected, such as by means of buses. Buses can interconnect cores within a processor module, cores within different processor modules of the same node, and/or cores within processor modules of different nodes. The buses can create an interconnection topology such that any core in any module of any node can communicate with any core in the same module and/or any cores in any other module of any node comprising the computer.

Processor module 530 illustrates buses interconnecting cores within a processor module. Buses P1-P6 connect each of cores 532-538 with each of the other cores in processor module 530. While processor module 530 illustrates an example set of buses (P1-P6) that fully interconnect each core within the module, in some embodiments fewer buses can enable any core to communicate with any other core in the same processor module. For example, processor module 530 can omit buses P4-P6 and any one core in module 530 can communicate with any other core in module 530 by means of interconnected cores forwarding communications to a destination core using buses P1-P3.

Cores in one processor module can be interconnected with cores in another module in the same node. Node 510 illustrates cores in processor module 530 connecting to cores in processor module 540, for example, using bus X1 between core 538 and core 548. Similarly, node 520 illustrates cores in processor module 550 connecting to cores in processor module 560, for example, using bus X2 between core 552 and core 564.

Cores in a processor module in one node can be interconnected with cores in a processor in a different node. FIG. 5 illustrates cores in processor module 530 of node 510 connecting to cores in processor module 550, for example, of node 520 using bus A1 between core 536 and core 552. Similarly, core 548 in processor module 540 of node 510 connects to core 564 in processor module 560, for example, of node 520 using bus A2.

FIG. 5 illustrates a single bus (X1) interconnecting cores in processor modules 530 and 540 in node 510, and cores in processor modules 550 and 560 in node 520 (bus X2). FIG. 5 further illustrates a single bus (A1) interconnecting cores in processor modules 530 of node 510 and 550 of node 520, and cores in processor modules 540 of node 510 and 560 of node 520 (bus A2). However, it would be apparent to one of ordinary skill in the art to include additional buses to interconnect any particular other cores, or to interconnect all cores, within one processor module with cores of other modules in the same node, and/or to include additional buses to interconnect any particular other cores, or to interconnect all cores, within one processor module with cores of other modules in a different node.

Embodiments can use buses interconnecting cores within a module and/or between modules in the same and/or different modules, and forwarding communications between the cores, using the buses, to enable any one core in a computer to communicate with any other core in that computer. For example, core 548 in processor module 540 can communicate with core 532 by means of bus X1 connecting core 548 to core 538, and core 538 forwarding the communications on bus P6 to core 532. In another example, core 548 in processor module 540 can communicate with core 554 in processor module 550 of node 520 by means of bus X1 connecting core 548 to core 538, core 538 forwarding the communications on bus P3 to core 536, core 536 forwarding the communications to core 552 on bus A1, and core 552 forwarding the communications to core 554 on bus P7. It would be apparent to one of ordinary skill in the art that a variety of bus configurations, different from those of the example of FIG. 5, can interconnect cores of different processor modules and nodes such that any one core can communicate with any other core comprising a computer.

FIG. 5 illustrates an embodiment in which cores within a module, or cores in different modules of the same or different nodes, can be interconnected to each other by means of point-to-point buses, such as by buses P1-P6 of processor module 530, or buses A1 and A2, or X1 and X2. In alternative embodiments (not shown), cores within a module can be interconnected by means other than point to point buses; for example, cores within a processor module, or in different processor modules, can be interconnected by a common or shared bus.

A memory of a computer can be comprised of memory modules and the memory modules can be connected to particular, different processors. FIG. 5 illustrates each of processors modules 530, 540, 550, and 560 connected to memory modules 572, 574, 576, and 578, respectively. In embodiments, a core in one processor module can access memory connected to another processor module by means of buses interconnecting the cores and forwarding accesses (e.g., read/write cycles and data) between interconnected cores. For example, core 548 can access memory 572 by means of bus X1 connecting it to core 538 and core 538, being a core of processor module 530 connected to memory module 572, performing the access. Similarly, core 548 can access memory 576 by means of communicating the access to core 538 using bus X1, core 538 forwarding the access on bus P3 to core 536, core 536 passing the access on bus A1 to core 552, and core 522, being a core of processor module 550 connected to memory module 576, performing the access.

A computer, such as example computer 102 of FIG. 1, can be a computer comprised of nodes such as shown in example computer 500. While not shown in FIG. 5 (for simplicity of the illustration), example computer 500 can include components other than processors, such as those shown in computing system 100 and including a memory, a test controller, a hypervisor, a resource allocator, an OS (e.g., OS 104A of FIG. 1), and an exerciser (e.g., exerciser 106 of FIG. 1), with interfaces for a test controller to communicate with the OS and/or exerciser, and for a test controller to communicate with the hypervisor and/or resource allocator. Example computer 500 can include a service element, and the service element can be an intermediary between, for example, a test controller and a hypervisor or resource allocator.

For purposes of illustrating the example of FIG. 5, but not limiting to embodiments, "test program" is understood to encompass either or both of an OS or an exerciser program operating within the OS, such as OS 104A and/or exerciser 106 of FIG. 1. An exerciser program, within the scope of the disclosure and various embodiments, can be a program developed specifically to test particular elements of a computer, or can be a program that, by virtue of its ordinary functions within a computer, has the effect of testing particular elements of a computer.

Testing a computer can require testing interconnections between processor cores and/or memory within a computer. For example, a computer system can configure a test program, such as exerciser 106 or OS 104A of FIG. 1, to test connections between processor cores such as buses P1-P6, A1, or X1 of computer 500. A computer system can configure a test program to test connections between processors within a module, such as between cores 532—538 of processor module 530. A computer system can configure a test program to test connections between processors within a node, such as between all cores included in processor modules 530 and 540 of node 510. Alternatively, or in addition, a computer system can configure a test program to test connections between all processors within a computer, such as all connections between all cores included in all of processor modules 530, 540, 550, and 560 of computer 500.

A test program may be required to test a memory, or interconnections between processors and a memory. For example, a computer system can configure a test program to access memory in particular memory modules, such as memory module 572, to test memory implemented in module 572. A computer system can configure a test program to access memory in particular memory modules from a particular processor module so as to test interconnections between, for example, individual processor modules or cores. For example, a computer system can configure a test program to access memory module 578 from processor core 532, so as to test interconnections between core 532 and other cores in processor module 530, 540, 550, and 560 that result in access to memory in memory module 578.

In an embodiment a computer system can configure a test program to test components within particular test domains. A test domain can be, for example, all of a computer, a portion of a computer (e.g., particular processor modules or cores and/or memory modules), or can be one or a subset of the nodes of a computer comprised of multiple node, such as computer 500. For example, all of computer 500 can be a test domain, and to test computer 500 a computer system can configure a test program to utilize, for example, processors in one or more particular processor modules (e.g., a particular core in one processor module of each node) or can configure a test program to utilize processors in every module of every node of computer 500. In another, node 510 can be a test domain, and to test node 510 a computer system can configure a test program to utilize only processors in modules 530 and/or 540 and only memory in modules 572 and/or 574.

However, as previously described, a program (e.g., a test program) can have a limit to the number of components of a particular type (e.g. processors or memory) that can be configured in the program. The limit can prevent utilizing, for example, all interconnections (e.g., buses) between components (e.g., processors and/or memory) using a single executing instance of the the program (e.g., an OS or exerciser), without, for example, modifications to the program to remove, or circumvent, the limit. The limit can apply to components within a domain, such as a test domain, and can apply to a domain that encompasses all of a computer or that encompasses a subset (e.g., a node) of a computer.

Figure 6:
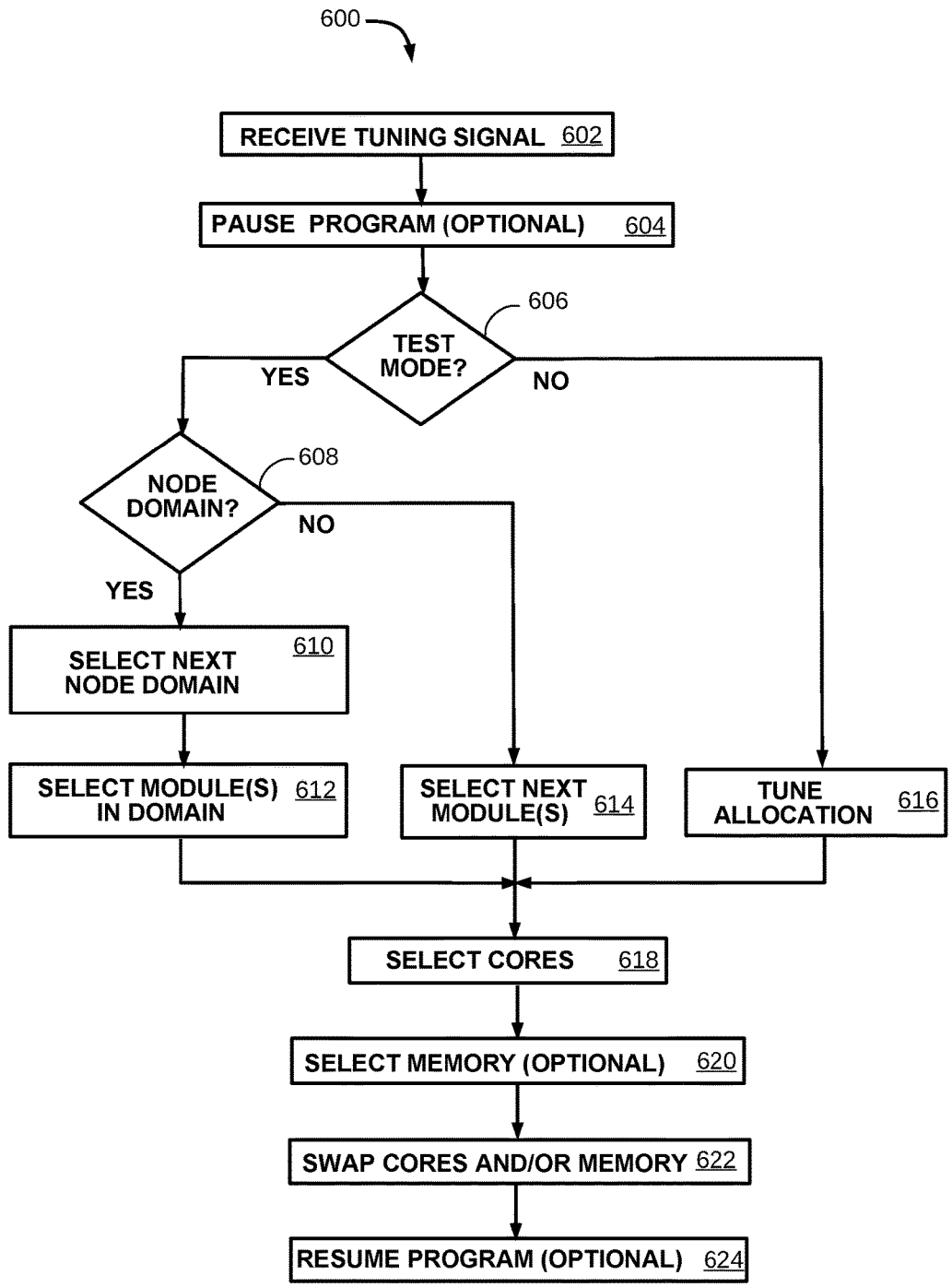
FIG. 6 is a flow chart illustrating an example method to test processor and memory interconnections in a computer, according to aspects of the disclosure.

Accordingly, FIG. 6 illustrates an example method, 600, for selecting components of a computer to allocate to a program from within a particular domain of the computer, such as a test domain. Selecting the components can be associated with utilizing interconnections between components of particular domains, and can include selecting components according to component limits of a program. Method 600 further illustrates swapping (e.g., de-allocate and allocate) resources, within a domain, allocated to a single instance of a program (e.g., an OS or exerciser), in which the program has component configuration limits that otherwise can prevent utilizing all components and/or interconnections with a single executing instance of the program.

For purposes of illustrating the method, but not limiting to embodiments, the method is described as performed by a resource allocator function of a computer (e.g., resource allocator 152 of FIG. 1) performing the method with respect to a computer having nodes, processor and memory modules, and interconnections between processors cores following the example of computer 500 of FIG. 5. Additionally, for purposes of illustrating the example of FIG. 6, but not limiting to embodiments, the method is described in the context of testing a computer, and "test program" is understood to encompass either or both of an OS, or a program operating within the OS, such as OS 104A and/or exerciser 106 of FIG. 1. However, it would be apparent to one of ordinary skill in the art that method 600, or elements thereof, can be performed to select components to swap, within particular domains and including particular program limits, in contexts other than testing a computer.

At 602 the resource allocator receives a signal to determine resource allocation to one or more programs configured to execute on the computer. The signal can be, for example, a signal such as those described in regard to 302 of FIG. 3. The signal can be directed at a particular program (e.g., an OS) executing on the computer or, alternatively, can be directed at modifying particular resource utilization or other operating states of the computer. At 604 the resource allocator, optionally, pauses execution of programs associated with the signal. For example, the signal can be associated with modifying a particular OS executing on the computer, or the computer can be executing a single OS, and the resource allocator can pause execution of that OS in response to the signal. In other embodiments, at 602 the resource allocator can determine to perform other elements of the method while the program continues to execute, and may not pause execution of the program.

At 606 the resource allocator determines if the computer is operating in a mode for testing the computer, interconnections between components (e.g., processors, memory, and/or interconnections between the foregoing) or, alternatively, some other mode in which the resource allocator should swap resources or components allocated to the program(s). The resource allocator can determine that the computer is in a particular (e.g., test) mode based on, for example, a configuration parameter stored in a memory of the computer, or based on an input received (e.g., in combination with the signal) from, for example, a test controller or a test program.

If, at 606, the resource allocator determines that the computer is not operating in a test (or, other swapping) mode, at 616 the resource allocator performs functions to determine a possible allocation of resources of the computer to the program (e.g., an OS). For example, the resource allocator can determine particular processor cores and/or memory blocks or modules to allocate to a program to improve performance of the program or the computer overall. Under some conditions, a resource allocator can determine, at 616, to not modify resources allocated to the program(s).

In embodiments, processors can have an "affinity" to memory in particular memory modules. Affinity can be, for example, a measure of latency to access the memory from a particular processor core (e.g., latency for an instruction executed on a core to read or write a location in a particular memory module). Using computer 500 of FIG. 5 as an example, cores in processor module 530 can have a high affinity to memory in module 572 such as, for example, deriving from module 572 being connected to processor module 530. Cores in processor module 530 can have a comparatively lower affinity to memory in module 574, such as deriving from those cores having to access module 574 by means of buses interconnecting cores in processor module 530 with cores in processor module 540. Cores in processor module 530 can have a comparatively lowest affinity to memory in modules of other nodes, such as module 576 or 578 in node 520 of computer 500, deriving, possibly, from those cores having to access memory in other nodes by means of buses interconnecting cores in the different nodes.

In an embodiment, a resource allocator function can select processor cores and memory to allocate to a program (e.g., an OS) based on affinity between the particular cores and memory connected to particular processor modules. For example, at 616 a resource allocator can determine particular processor cores and/or memory to allocate to a program to improve performance of the program, or the computer overall, based on affinity of the processor cores to the memory.

If, at 606, the resource allocator determines that the computer is operating in a test or swapping mode, at 608 the resource allocator determines if the mode is directed to a domain of the computer that is a subset of the components (or, "sub-domain") of the computer. The resource allocator can determine a test domain based on, for example, a configuration parameter stored in a memory of the computer, or based on an input received (e.g., in combination with the signal) from a test controller or a test program. Testing components within all of a computer can direct testing to, for example, any particular combination of processors, memory, and/or interconnections thereof, within the computer. Alternatively, testing components within a subset domain can limit testing to, for example, processors, memory, and/or interconnections thereof, within the subset domain, such as a subset of nodes within computer 500.

At 608 the resource allocator determines if the test is directed at a node domain (e.g., a subset domain) of computer 500. A "node domain" can be a single node or, in an alternative embodiment, a node domain can encompass a particular subset of nodes of a computer. If, at 608, the resource allocator determines that the test domain is a node domain, at 610 the resource allocator selects a node, or nodes, in a next node domain from which to select cores to swap for cores presently allocated to the program.

At 610, the resource allocator can select the next node domain based on, for example, an ordinal number or identifier of the nodes, based on a configuration of the nodes in the computer, or based on a parameter stored (for example) in a memory of the computer or received as input from the program or a test controller. The resource allocator can keep a record of cores previously allocated to the program such that the resource allocator can determine if all cores in the node(s) from which cores are presently allocated to the program have, at some previous time, been allocated to the program. If not all cores have been utilized in the present node(s), the resource allocator can select the present node(s) to select a set of cores to swap with those presently allocated to the program. If, on the other hand, all cores in the present node(s) have, at some previous time, been allocated to the program, the resource allocator can select another node from which to select cores that have not yet been allocated to the program.

At 612 the resource allocator selects one or more processor modules, within the next node domain selected at 610, from which to select cores (and/or threads) to swap for the cores, or threads, presently allocated to the program. If, on the other hand, at 608 the resource allocator determines that the domain is not a node domain (e.g., the domain is all of the computer), or the testing is directed at, for example, interconnections that span beyond a node domain, at 614 the resource allocator can select a set of one or more processor modules to swap from among any of the processor modules, within the computer, or outside of a particular sub-domain of the computer, which have cores not yet allocated.

The resource allocator can keep a record of cores previously allocated to the program such that the resource allocator can determine if all cores in the module(s) from which cores are presently allocated to the program have, at some previous time, been allocated to the program. If all cores in the module(s) from which the cores presently allocated to the program have been allocated to the program, the resource allocator can select one or more other processor modules in which not all cores have been allocated to the program (among modules within the node selected in 610, for example, if the testing is node bounded). The resource allocator can select a next set of processor modules based on, for example, an ordinal number or identifier of the modules (or, a combination of node and module ordinal identifiers), based on a configuration of the modules in the computer, or based on a test parameter stored (for example) in a memory of the computer or received as input from the program or a test controller. At 612, 614, or 616 a resource allocator can select a single processor module, or a subset of cores within a single processor module, from which to select cores and/or threads to swap with those presently allocated to the program.

At 618 the resource allocator selects, from within the module(s) selected at 612, 614, or 616 a set of cores (and/or threads within the cores) to swap with those presently allocated to the program. The program can have a resource limit, such as, for example, a maximum number of processors (e.g., cores and/or threads) that it can utilize. Accordingly, the resource allocator can limit the number of processor cores (and threads within the cores) to allocate to the program. The resource allocator can perform a method such as, for example, method 400 of FIG. 4, to make the determination of cores and/or threads to swap with cores (and/or threads) presently allocated to the program.

Optionally, at 620 the resource allocator can select memory to allocate to the program and/or swap for memory presently allocated to the program. A resource allocator can select memory to allocate or swap based on, for example, the testing being directed at testing particular memory components (e.g., memory modules) or interconnections between memory components and/or cores (e.g., inter-core buses such as buses P, A, and X of computer 500). For example, if the test domain is a node domain, a resource allocator can choose cores within a set of processor modules within that node domain and can select memory connected to only those processor modules, and/or memory connected to only other processors within the same node domain.

Alternatively, or if the test domain is not a node (for example) domain, a resource allocator can choose cores within a set of processor modules within one node and can select memory connected to processor modules and/or memory connected to processors within other nodes. In some embodiments, a resource allocator can select, in each of the nodes, cores within a processor module and/or memory connected to that processor module.

At 622, the resource allocator swaps the cores (and/or threads) selected at 610 through 620 for cores, threads, and/or memory presently allocated to the program. The resource allocator can de-allocate the currently allocated cores, threads, and/or memory, and allocate the cores, threads, and/or memory, determined at 612 through 620, to perform the swapping. At 624, if at 604 the resource allocator had paused executions of the program, the resource allocator, optionally, resumes execution of the program with the program now utilizing the resources (e.g., cores, threads, and/or memory) allocated (or, swapped) at 622. In other embodiments, at 624 the resource allocator may determine to not resume execution of the program. For example, if execution of the program had not been paused (at 604, for example) or resuming execution of the program is deferred to a subsequent time, event, or other component of the computer, the resource allocator can determine, at 624, to not resume execution of the program.

In embodiments of the disclosure, a computer can perform the swapping of resources, such as at 622, transparently to the test program. For example, a hypervisor, or a resource allocator, can exchange processors and/or an amount of memory presently allocated to a test program with an equivalent number of different processors, and/or an equivalent amount of different memory such that, at 624, the test program resuming execution does not require that the test program recognize that the particular processors and/or memory are different physical units than previously allocated. A processor can be a virtual processor, and/or memory can be virtual memory, and in resuming a test program at 624 the different physical processors and/or memory swapped for those allocated prior to pausing the test program at 604 can be transparent to the test program.

An embodiment can repeat method 600 to select a subset of resources or components (e.g., processor modules, cores, threads, and/or memory) for testing, below a test program limit, so as to accomplish testing all resources or components utilizing a single instance of the test program.

The present invention may be a system, a method, and/or a computer program product at any possible technical detail or level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for testing a computer, wherein the computer includes a plurality of hardware components, wherein the plurality of hardware components includes a plurality of processors, and wherein the method comprises:
   receiving a signal to determine resources of the computer to allocate to a program, wherein the program is executed by at least one processor included in the plurality of processors;
   determining, in response to the signal, to allocate to the program an at least one first hardware component included in the plurality of hardware components;
   detecting, in response to the signal, that the computer is operating in a test mode;
   selecting, in response to the signal and based at least in part on the computer operating in the test mode, a subset of the plurality of hardware components included in the computer, wherein the subset includes hardware components associated with the at least one first hardware component, wherein the subset includes hardware components not presently allocated to the program, and wherein the subset comprises a number of hardware components no greater than a program limit; and
   swapping an at least one second hardware component for an at least one third hardware component, wherein the at least one second hardware component is included in the subset of the plurality of hardware components included in the computer, wherein the at least one third hardware component is included in the plurality of hardware components included in the computer, the at least one third hardware component presently allocated to the program, and wherein the swapping of the at least one second hardware component for the at least one third hardware component comprises de-allocating, from the program, the at least one third hardware component and allocating, to the program, the at least one second hardware component.

2. The method of claim 1, wherein the swapping further comprises:
   pausing execution of the program;
   de-allocating, from the program, the at least one third hardware component;
   allocating, to the program, the at least one second hardware component; and
   resuming execution of the program.

3. The method of claim 1, wherein testing the computer comprises testing one or both of a set of processors included in the plurality of processors and a memory in communication with a processor included in the plurality of processors.

4. The method of claim 1, wherein each of the at least one second hardware component and the at least one third hardware component comprise a processor included in the plurality of processors.

5. The method of claim 1, wherein the first hardware component is one of a first processor included in the plurality of processors and at least a portion of a memory in communication with a second processor included in the plurality of processors.

6. The method of claim 1, wherein the method is performed by a hypervisor.

7. The method of claim 1, wherein the program limit is based on one or both of a number of processors the program can utilize and an amount of memory the program can utilize.

8. A computer program product for testing a computing system, wherein the computer includes a plurality of hardware components, wherein the plurality of hardware components includes a plurality of processors, wherein the computer program product comprises a computer readable storage medium having program instructions embodied therewith, wherein the program instructions are optionally stored in a memory, and wherein the program instructions are executable by a first processor to perform a method comprising:
   receiving, by the first processor, a signal to determine resources of the computer to allocate to a program, wherein the program is executed by at least one processor included in the plurality of processors;

determining, by the first processor in response to the signal, to allocate to the program an at least one first hardware component included in the plurality of hardware components;

detecting, by the first processor in response to the signal, that the computer is operating in a test mode;

selecting, by the first processor in response to the signal and based at least in part on the computer operating in the test mode, a subset of the plurality of hardware components included in the computer, wherein the subset includes hardware components associated with the at least one first hardware component, wherein the subset includes hardware components not presently allocated to the program, and wherein the subset comprises a number of hardware components no greater than a program limit; and swapping, by the first processor, an at least one second hardware component for an at least one third hardware component, wherein the at least one second hardware component is included in the subset of the plurality of hardware components included in the computer, wherein the at least one third hardware component is included in the plurality of hardware components included in the computer, the at least one third hardware component presently allocated to the program, and wherein the swapping of the at least one second hardware component for the at least one third hardware component comprises de-allocating, from the program, the at least one third hardware component and allocating, to the program, the at least one second hardware component.

9. The computer program product of claim 8, wherein the swapping further comprises:

pausing, by the first processor, execution of the program;

de-allocating, by the first processor from the program, the at least one third hardware component;

allocating, by the first processor to the program, the at least one second hardware component; and resuming, by the first processor, execution of the program.

10. The computer program product of claim 8, wherein testing the computer comprises testing one or both of a set of processors included in the plurality of processors and a memory in communication with a processor included in the plurality of processors.

11. The computer program product of claim 8, wherein each of the at least one second hardware component and the at least one third hardware component comprise a processor included in the plurality of processors.

12. The computer program product of claim 8, wherein the first hardware component is one of a second processor included in the plurality of processors and at least a portion of a memory in communication with a third processor included in the plurality of processors.

13. The computer program product of claim 8, wherein the method is performed by a hypervisor.

14. The computer program product of claim 8, wherein the program limit is one or both of a maximum number of processors the program can utilize and a maximum amount of memory the program can utilize.

15. A system for testing a computer, the system comprising:

the computer;

a plurality of hardware components;

a plurality of processors included in the plurality of hardware components included in the computer; and a first processor, wherein the first processor is configured to perform a method comprising:

receiving, by the first processor, a signal to determine resources of the computer to allocate to a program, wherein the program is executed by at least one processor included in the plurality of processors;

determining, by the first processor in response to the signal, to allocate to the program an at least one first hardware component included in the plurality of hardware components;

detecting, by the first processor in response to the signal, that the computer is operating in a test mode;

selecting, by the first processor in response to the signal and based at least in part on the computer operating in the test mode, a subset of the plurality of hardware components included in the computer, wherein the subset includes hardware components associated with the at least one first hardware component, wherein the subset includes hardware components not presently allocated to the program, and wherein the subset comprises a number of hardware components no greater than a program limit; and swapping, by the first processor, an at least one second hardware component for an at least one third hardware component, wherein the at least one second hardware component is included in the subset of the plurality of hardware components included in the computer, wherein the at least one third hardware component is included in the plurality of hardware components included in the computer, the at least one third hardware component presently allocated to the program, and wherein the swapping of the at least one second hardware component for the at least one third hardware component comprises de-allocating, from the program, the at least one third hardware component and allocating, to the program, the at least one second hardware component.

16. The system of claim 15, wherein the swapping further comprises:

pausing, by the first processor, execution of the program;

de-allocating, by the first processor from the program, the at least one third hardware component;

allocating, by the first processor to the program, the at least one second hardware component; and resuming, by the first processor, execution of the program.

17. The system of claim 15, wherein testing the computer comprises testing one or both of a set of processors included in the plurality of processors and a memory in communication with a second processor included in the plurality of processors.

18. The system of claim 15, wherein each of the at least one second hardware component and the at least one third hardware component comprise a processor included in the plurality of processors.

19. The system of claim 15, wherein the first hardware component is one of a second processor included in the plurality of processors and at least a portion of a memory in communication with a third processor included in the plurality of processors.

20. The system of claim 15, wherein the program limit is one or both of a maximum number of processors the program can utilize and a maximum amount of memory the program can utilize.

* * * * *